US008200674B2

(12) United States Patent
Burba et al.

(10) Patent No.: US 8,200,674 B2
(45) Date of Patent: Jun. 12, 2012

(54) PERSONALIZED MEDIA RECOMMENDATION

(75) Inventors: Alexander Burba, Seattle, WA (US); Ivan Petrov Trindev, Issaquah, WA (US); Zerelina R. Mukherjee, Redmond, WA (US); Nicole Simone DesRosiers, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 437 days.

(21) Appl. No.: 12/356,046

(22) Filed: Jan. 19, 2009

(65) Prior Publication Data
US 2010/0185671 A1 Jul. 22, 2010

(51) Int. Cl.
*G06F 17/30* (2006.01)

(52) U.S. Cl. ......... 707/748; 707/749; 707/754; 707/620

(58) Field of Classification Search .................. 707/620, 707/748, 754, 749
See application file for complete search history.

(56) References Cited

U.S. PATENT DOCUMENTS

| 6,947,922 | B1 | 9/2005 | Glance |  |
|---|---|---|---|---|
| 7,081,579 | B2 | 7/2006 | Alcalde et al. |  |
| 7,188,355 | B1* | 3/2007 | Prokopenko et al. | 725/46 |
| 7,653,761 | B2* | 1/2010 | Juster et al. | 386/293 |
| 7,685,204 | B2* | 3/2010 | Rogers | 707/770 |
| 7,720,871 | B2* | 5/2010 | Rogers et al. | 707/802 |
| 7,865,522 | B2* | 1/2011 | Purdy et al. | 707/790 |
| 2003/0227478 | A1* | 12/2003 | Chatfield | 345/751 |
| 2004/0193649 | A1 | 9/2004 | Doshida et al. |  |
| 2006/0190464 | A1 | 8/2006 | Yamamoto et al. |  |
| 2006/0195516 | A1* | 8/2006 | Beaupre | 709/203 |
| 2006/0195789 | A1* | 8/2006 | Rogers et al. | 715/727 |
| 2007/0005653 | A1* | 1/2007 | Marsh | 707/104.1 |
| 2008/0016464 | A1* | 1/2008 | Gao et al. | 715/825 |
| 2008/0052371 | A1 | 2/2008 | Partovi et al. |  |
| 2008/0059422 | A1 | 3/2008 | Tenni et al. |  |
| 2008/0133441 | A1 | 6/2008 | West et al. |  |
| 2008/0147215 | A1 | 6/2008 | Kim et al. |  |
| 2008/0215173 | A1 | 9/2008 | Hicken et al. |  |
| 2008/0228587 | A1 | 9/2008 | Slaney et al. |  |
| 2009/0049979 | A1* | 2/2009 | Naik et al. | 84/636 |
| 2009/0157795 | A1* | 6/2009 | Black | 709/202 |
| 2010/0070490 | A1* | 3/2010 | Amidon et al. | 707/722 |

(Continued)

OTHER PUBLICATIONS

Piquepaille Roland, "A New Music Recommendation System from Sun", Retrieved at<<http://blogs.zdnet.com/emerging-tech/?p=737>>, Nov. 5, 2007, pp. 2.

(Continued)

*Primary Examiner* — Rehana Perveen
*Assistant Examiner* — Tiffany Thuy Bui
(74) *Attorney, Agent, or Firm* — Alleman Hall McCoy Russell & Tuttle LLP

(57) ABSTRACT

Systems and methods for personalized media recommendation are provided. One example system may include a media server including a media database containing a plurality of media tracks and a database schema defining multiple media styles. The media server may further include a media delivery engine configured to transmit media tracks to each of a plurality of media clients. The system may further include a feedback module configured to receive history data from each of the media clients. Further still, the system may include a recommendation engine configured to compute a plurality of user-specific style weights, and to select one or more recommended media tracks for each user, The recommendation engine may be further configured to send a recommendation message to the media client including media links to the recommended media tracks on the media server, to cause the media client to display the media links to a user.

15 Claims, 3 Drawing Sheets

U.S. PATENT DOCUMENTS

2010/0153445 A1* 6/2010 Bi et al. .................. 707/770

OTHER PUBLICATIONS

Good Robin, "New Music Recommendation System is Based on FOAF Personal Profiling", Retrieved at<<http://www.masternewmedia.org/music_recommendation/music_recommendation_systems/FOAF_based_music_recommendation_system_uses_personal_profiles_20051001.htm>>, Oct. 1, 2005, pp. 6.

* cited by examiner

PERSONALIZED MEDIA RECOMMENDATION

BACKGROUND

Current techniques for recommending new music to users of a recommending service tend to rely on active user participation. Users can purchase and rate music they like and, based on this information, a recommending service (e.g., a website) recommends new music for the user. For example, a user can indicate artists, genres, or songs as "favorites". Other popular types of ratings include binary or numerical ratings, such that when a user listens to a song or album, they can rate whether or not they enjoyed the music, to what degree, and if it is a favorite. From these ratings, a recommending service can determine what songs, albums and artists the user may enjoy.

One drawback with this model of music recommendation is that the user must purchase or rate a significant amount of music before recommendations can be made, or before the recommendations become relevant to the user. Further, the user must continually update the ratings as music preferences change in order for the recommendations to continue to be relevant. Users may find this process frustrating as rating music can be tedious and time-consuming. For example, a user may forget to rate some favorite music or artists, resulting in recommendations that are irrelevant to the user. As a result, the user may abandon the recommending service as a resource for discovering new music.

SUMMARY

Systems and methods for personalized media recommendation are provided. One example system may include a media server. The media server may include a media database containing a plurality of media tracks and a database schema defining multiple media styles, each of the media tracks being assigned one or more track-specific style weights, and each track-specific style weight indicating a degree of applicability of a media style to a corresponding media track. The media server may further include a media delivery engine configured to transmit media tracks to each of a plurality of media clients via a computer network for playback via the media client. The system may further include a feedback module configured to receive history data from each of the media clients, the history data including a track identifier and play count for each media track played by a user of each media client over a period of time. Further still, the system may include a recommendation engine configured to compute a plurality of user-specific style weights, based on the track-specific style weights and play counts contained in the history data received for each user from each media client. The recommendation engine may also be configured to select one or more recommended media tracks for each user, based on the user-specific style weights and the track-specific style weights for the recommended media tracks. The recommendation engine may be further configured to send a recommendation message to the media client including media links to the recommended media tracks on the media server, to cause the media client to display the media links to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
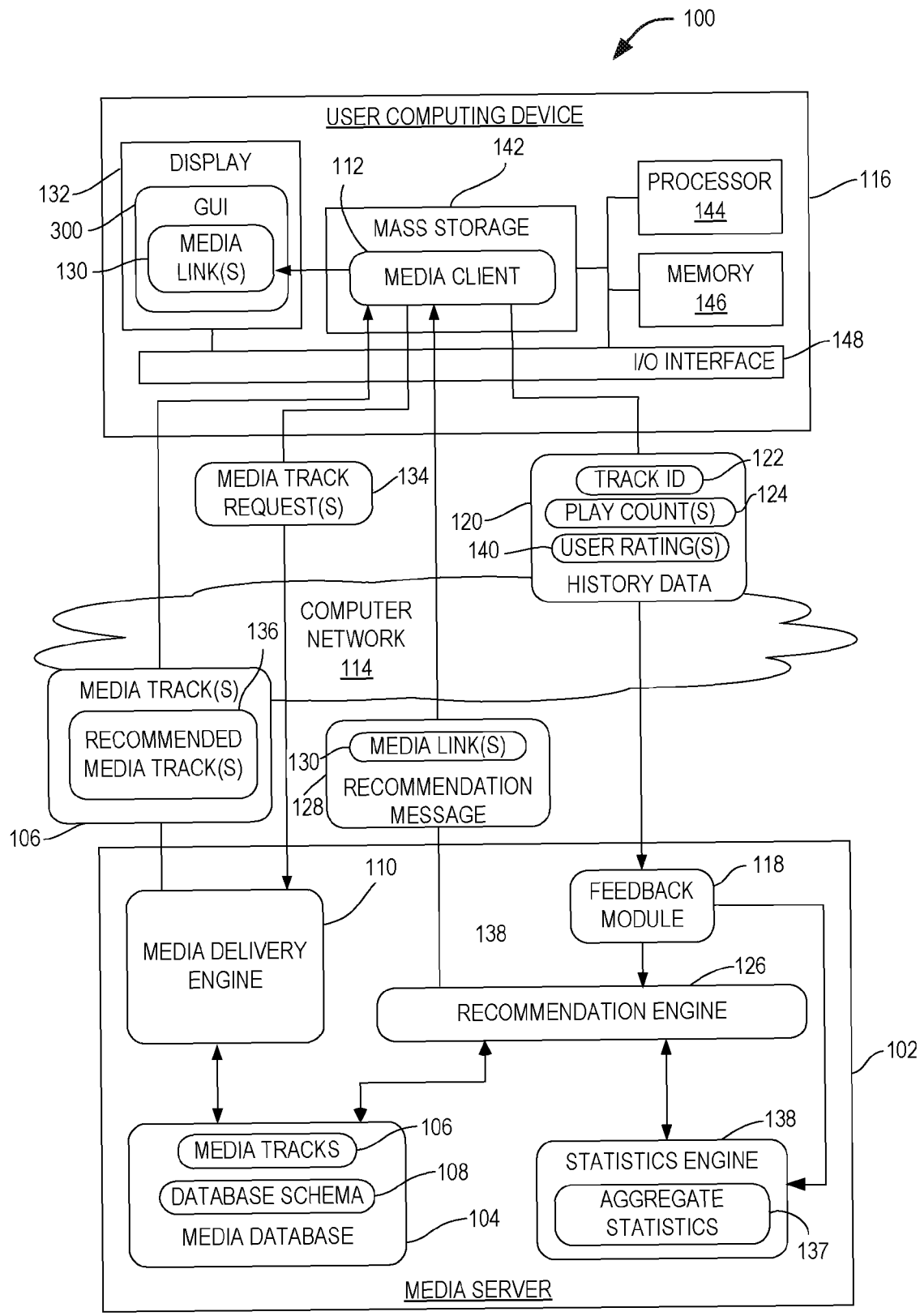
FIG. 1 is a schematic view of a system for making personalized media recommendations.

FIG. 1 is a schematic view of a system 100 for making personalized media recommendations. The system 100 includes a media server 102, including a media database 104, which in turn, includes a plurality of media tracks 106. The media tracks may include audio programs and/or video programs, which may feature a variety of content such as songs, movies, news, etc. Further, the media server 102 includes a database schema 108 which defines multiple media styles. For example, media styles may include musical genres (e.g., classical, rock, etc.), movie genres (e.g., drama, comedy, etc.), and podcast types (e.g., science, popular culture, etc.), as some examples. In one specific example, thousands of media styles may be defined in the database schema 108.

Each of the media tracks 106 in the media database 104 may be assigned one or more track-specific style weights. A track-specific style weight indicates a degree of applicability of a particular media style to a corresponding media track. For example, a particular media track may have three track-specific style weights, such as a 40% jazz weight, a 40% classical weight, and a 20% rock weight. Typically, these track-specific style weights are applied by human operators who listen to the song and categorize it by one or more styles, and assign the track-specific style weights for each applicable style. Programmatic approaches to selecting the applicable styles and assigning the track-specific style weights may also be applied.

The media server 102 also includes a media delivery engine 110 configured to transmit media tracks 106 to each of a plurality of media clients, one of which is shown as media client 112. The media tracks may be transmitted via a computer network 114, for playback via the media client 112. As one example, the media client 112 may be a program executed on a user computing device 116 such that the media client 112 can interface with the media server 102. For example, the user computing device 116 may be a portable media player or mobile telephone with portable media playing functionality, and the media client may be a media playback program executed on the portable media player or mobile telephone. In addition, the user computing device may be a personal computer, and the media client may be a playback program executed on the personal computer. In some examples, several users may use the same media client. In other examples, a media client may be associated with a particular user. In either case, access to a media client may be controlled by, for example, a login including a username and password.

The media server 102 may further include a feedback module 118 configured to receive history data 120 for each user of each of the media clients. The history data 120 may include a track identifier 122 and play count 124 for each media track played by a user of the media client 112 over a period of time. The history data 120, received at the feedback module 118, may include history data tracked from the time and date of last server contact, or may include cumulative history data tracked from the installation of a given media client 112. It will be appreciated that the media client 112 presents the user with the option to opt in to the recommendation functionality of the media server 102 described in detail below and thus no history data 120 is sent to the media server 102 without user authorization.

The media server 102 may further include a recommendation engine 126. The recommendation engine 126 may be configured to compute a plurality of user-specific style weights. A user-specific style weight may be a weight associated with a user of the media client 112, indicating media styles to which a user has listened. Accordingly, the user-specific style weights may be based on the track-specific style weights and play counts 124 contained in the history data 120 received for each user from each media client. Because the track-specific style weights and play counts 124 contained in the history data 120 for a given user of a media client are associated with media tracks that have been listened to by the user, the user-specific style weights will reflect to a large extent the media styles the user prefers. In some embodiments, the media client 112 may be configured to enable a user to input a user rating for each media track, and user ratings may be included in the history data 120. Accordingly, the user-specific style weights may further be based on user ratings for the media tracks, irrespective of whether the user has listened to each media track.

The recommendation engine 126 may be further configured to select one or more recommended media tracks for each user, based on the user-specific style weights and the track-specific style weights for the recommended media tracks. That is, the recommendation engine 126 may consider a predetermined number of user-specific style weights with the highest values, and select recommended media tracks with correspondingly high track-specific style weights. For example, if a user has high user-specific style weights associated with hip hop and pop music, the recommendation engine may select recommended media tracks that have high track-specific style weights associated with hip hop and pop.

The recommendation engine may be configured to select the one or more recommended media tracks 136 solely from among newly released media tracks that have become available on media server 102 within a predetermined period of time. Alternatively, the recommendation engine may select the recommended media tracks 136 from a combination of previously released and newly released media tracks, or solely from previously released media tracks. In some embodiments, the user may control, via the graphical user interface (GUI) 300 of the media client 112, whether the recommendation engine 126 selects recommended media tracks 136 from newly released or previously released media tracks, or both.

The recommendation engine 126 may be further configured to send a recommendation message 128 to the media client 112. The recommendation message 128 may include media links 130 to the recommended media tracks on the media server 102, and may cause the media client 112 to display the media links 130, to a user, in a graphical user interface 300 (shown in detail in FIG. 3) on a display 132 of the user computing device 116.

The media delivery engine 110 may be configured to receive media track requests 134 from the media client 112. In response to one of the media track requests 134, the media delivery engine may be configured to transmit media tracks 106, stored in the media database 104, to the media client 112 for playback to the user via a graphical user interface 300. Among these media track requests 134, the media delivery engine 110 may be configured to receive a media track request 134 from the media client 112 for one of the recommended media tracks, responsive to a traversal (e.g., via a mouse click, touch activation, etc.) of one of the displayed media links 130. The media delivery engine 110 may then send a requested recommended media track 136, associated with the media track request 134, as one of the media tracks 106, to the media client 112. In this manner, the user of the media client 112 may obtain and play back one or more of the recommended media tracks 136 from the media server.

The media server 102 may further include a statistics engine 138 configured to compute aggregate statistics 137 based on history data from various users of the plurality of media clients. The aggregate statistics 137 may include the total number of times a media track has been played by all users, an average number of times a media track has been played per user, a total number of minutes a media track has been played by all users, and an average user rating of a media track by all users, as some examples. The aggregate statistics may be based either on all users, or a predefined subset of users, such as all users in a particular geographic region, users associated with a particular organization, or users sharing a particular demographic profile.

It can be appreciated that by calculating aggregate statistics 137, the recommendation engine 126 can select the one or more recommended media tracks 136 for each user based on the aggregate statistics 137 of the media tracks. For example, the recommendation engine 126 may select media tracks for recommendation based on the most played or most highly rated songs across all users, in combination with other user-specific and track-specific selection factors described herein. By using the aggregate statistics 137 for the selection of media tracks to recommend to a user, the likelihood that the user will enjoy the recommendation, and thus have a positive interaction with the system, may increase.

The recommendation engine 126 may be further configured to apply one of a number of thresholds when selecting the one or more recommended media tracks. One of the thresholds may be a threshold play count, according to which the recommendation engine 126 only selects recommended media tracks based on media styles that have been played more than the threshold play count, by the user of a given media client. In one example, the threshold play count is 15 times. According to this example, if the user has listened to a number of jazz songs at least 15 times, the recommendation engine may select media tracks that have a jazz track-specific style weight. On the other hand, if the user has only listened to jazz songs less than 15 times, for example, the recommendation engine 126 may not select jazz media tracks. In another example, the threshold play count may be any number up to 50, or higher, as desired.

Another threshold that may be applied is a threshold percentage of total play time, according to which the recommendation engine 126 only selects recommended media tracks based on media styles that account for the threshold percentage of the total play time of the user. For example, the recommendation engine 126 may only select jazz media tracks if the user has listened to jazz songs at least 5% of the time he or she is listening to music. In another example, the threshold percentage may be any percentage up to 50%. Further still, a threshold number of media styles may be employed, according to which the recommendation engine 126 only selects recommended media tracks from a threshold number of media styles. That is, the recommendation engine 126 may only select media tracks from the media styles associated with the user's top three user-specific style weights. Alternatively, another threshold number of media styles may be used, for example, between one and seven top styles, or more if desired. Consider that a user has the following user-specific style weights: 5% jazz, 15% hip hop, 20% rock, 30% classical, and 40% country. The recommendation engine 126 may then select media tracks with track-specific style weights associated with rock, classical, and country media styles, when the threshold number of media styles is set to three.

The selection of a plurality of recommended media tracks by a recommendation engine 126 may include generating a set of candidate recommended media tracks, and filtering out candidate recommended media tracks that the user has previously played to thereby result in the plurality of recommended media tracks. In this way, the user can be presented with songs they have not heard before. Further, the recommendation engine 126 can be configured to filter out candidate recommended media tracks that are not available for download from the media delivery engine 110, thereby improving the user's experience with the system by providing access to the recommended media tracks.

It may be appreciated that the history data 120 can include user ratings 140 for one or more of the recommended media tracks 136, and the recommendation engine 126 can thus filter out candidate recommended media tracks that are associated with a user rating below a first predetermined rating threshold and/or above a second predetermined rating threshold. In this way, a user is not presented with a recommended media track for which the user has already indicated a like or dislike.

The recommendation engine 126 may be configured to prioritize, or rank, the recommended media tracks according to a ranking algorithm that determines a strength of a match between the user-specific style weightings, the track-specific style weightings for each media track, and the various other factors discussed above. As discussed below, in some embodiments the recommendation message 128 may include media links 130 to a large number of recommended media tracks 136, which are in turn displayed in smaller subsets to the user via the media client 112. By prioritizing the recommended media tracks 136 according to the ranking algorithm, the media links 130 to the recommended media tracks 136 may be presented in an order that ensures the most relevant recommendations are displayed to the user first.

In addition, the selection of recommended media tracks 136 may also include prioritizing the recommended media tracks according to those recommended media tracks that are most popular according to the aggregate statistics 137. Thus, the recommended media tracks may be presented to the user in an order corresponding with the priority of the recommended media tracks. For example, if three rock songs have been selected as recommended media tracks for the user, the most popular song, across all users of all media clients, will be presented first, or in a way that is most salient (e.g., largest, bright color, etc.).

The recommendation engine 126 may be further configured to compute, select and send the recommendation message 128 to each media client 112 according to a predetermined schedule, such as once a week or once a day. Alternately, in another embodiment, the recommended media tracks 136 are selected from among new media tracks that have become available on the media server 102, and thus the recommendation engine 126 may be configured to compute, select and send the recommendation message 128 to each media client 112 when such new media tracks are determined to be available from the media delivery engine 110, such as when new media tracks are released from various publishers.

When new media tracks are released, for example, the recommendation engine 126 may select one or more recommended media tracks from the new media track releases from an artist that the user has listened to a threshold number of artist playback times. A number of artist playback times may include a number of times a user has listened to the artist, a total duration a user has listened to the artist, a percentage of time or plays the user has listened to the artist compared to the user's total playback history. Artist playback times may be included in the history data 120, such that a user's preference for an artist can be used by the recommendation engine 126 when selecting recommended new media tracks.

The recommendation engine 126 may be configured to select a threshold recommendation number of recommended media tracks for each user of each media client. For example, the recommendation engine 126 may select between 25 and 50, or up to 100 recommended media tracks per recommendation message 128. It may be appreciated that for a subsequent or prior recommendation message, a differing set of recommended media tracks (or any other threshold number of media tracks) may be included in the recommendation message, even in the absence of new history data for a user. As discussed above, these recommended media tracks 136 may be displayed in subsets to the user via the graphical user interface 300 or media client 112, according to the prioritization determined by the ranking algorithm.

With regard to the hardware employed in system 100, the media client 112 and other programs of user computing device 116 may be stored in a mass storage 142 and executed on a processor 144 using portions of memory 146 and may further be configured to communicate with software programs on other computing devices across one or more computer networks, such as computer network 114, via input/output interface 148. Display 132 may also be configured to receive display output from the media client 112 via the input/output interface 148. It will further be appreciated that the media server 102 may be a single server, or multiple distributed servers interoperating across one or more computer networks 114 (e.g., Local area network, Internet, etc.), and the components of the media server 102 may be implemented on these distributed devices.

Figure 2:
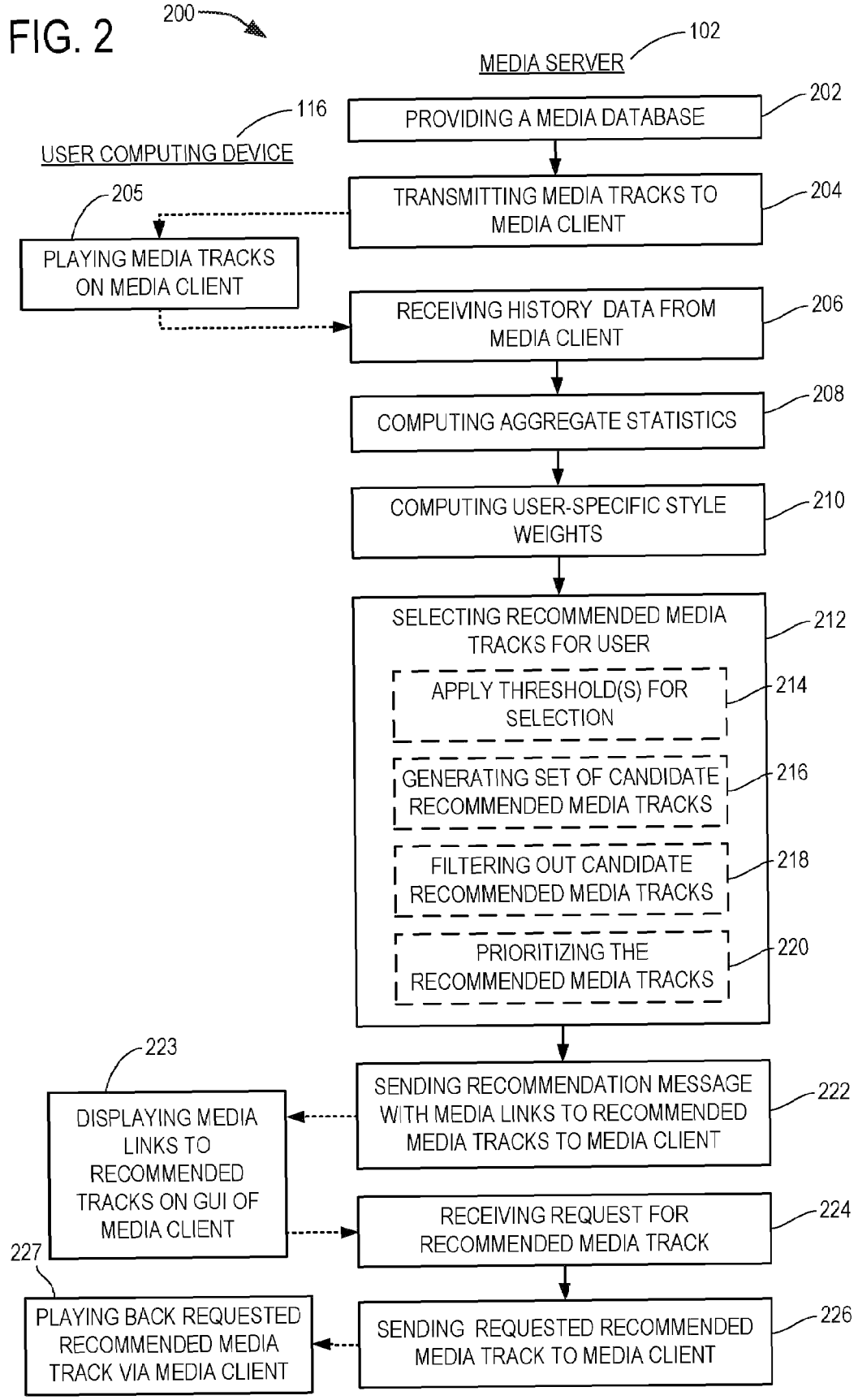
FIG. 2 is a flowchart illustrating a method for recommending personalized media.

Referring now to FIG. 2, a flowchart illustrating a method 200 for recommending personalized media is shown. It will be appreciated that method 200 may be performed utilizing the hardware and software components of system 100, described above, or by other suitable hardware and software components. Thus, as indicated in FIG. 2, the even numbered steps on the right hand side of FIG. 2 may be performed at the media server 102, while the odd numbered steps on the left hand side of FIG. 2 may be performed at the user computing device 116.

At 202, the method includes providing a media database containing a plurality of media tracks and a database schema defining multiple media styles, at a media server. Each of the media tracks may be assigned one or more track-specific style weights, and each track-specific style weight may indicate a degree of applicability of a media style to a corresponding media track, as described above. The method may further include, at 204, transmitting one or more media tracks from a media delivery engine to each of a plurality of media clients via a computer network for playback via the media clients. At 205, the method may include playing the media tracks on a media client of a user computing device. It will be appreciated that history data may be recorded at each media client for each user, as described above. At 206, the method may include receiving history data from each of the media clients. The history data may include a track identifier and play count for each media track played by a user of a media client over a period of time, as described above.

At 208, the method may include computing aggregate statistics based on the history data from the plurality of media clients. In this case, the selection of one or more recommended media tracks for each user may be further based on the aggregate statistics, in the manner described above.

The method may further include, at 210, computing a plurality of user-specific style weights, based on the track-specific style weights and on play counts contained in the history data received for each user, from each media client on each user computing device.

At 212, the method may include selecting one or more recommended media tracks for each user, from the plurality of media tracks, based on the user-specific style weights and the track-specific style weights for the plurality of media tracks. Here, the plurality of media tracks may be defined to include newly released media tracks, previously released media tracks, or both, as described above. It may be appreciated that the selecting can include applying one or more thresholds at 214 to select the one or more recommended media tracks for a user. One of the thresholds may be a threshold play count, according to which the recommendation engine only selects recommended media tracks based on media styles that have been played, by the user, more than the threshold number play count. Another threshold may be a threshold percentage of total play time, according to which the recommendation engine only selects recommended media tracks based on media styles that account for the threshold percentage of the total play time of the user. Further, another threshold may be a threshold number of media styles, according to which the recommendation engine only selects recommended media tracks from a threshold number of media styles. These thresholds may be applied individually or in combination, as desired, to produce useful recommendations for each user.

Further still, the selecting of recommended media tracks can include generating a set of candidate recommended media tracks at 216, and filtering out, at 218, candidate recommended media tracks that the user has previously played to thereby result in the recommended media tracks. The selecting can also include filtering out candidate recommended media tracks that are not available for download from the media delivery engine, and/or filtering out candidate recommended media tracks that are associated with a user rating included in the history data. Further still, selecting can include selecting as candidate recommended media tracks, new media track releases from an artist that the user has listened to a threshold number of artist playback times, according to the history data if and/or when an artist releases new media tracks, as described above.

The selecting may include prioritizing the recommended media tracks, at 220, according to those recommended media tracks that are most popular or most played, for example, according to the aggregate statistics, based on a ranking algorithm, as described above.

Once the recommended media tracks have been selected, the method may include sending a recommendation message, for each user, to the media client at 222. The recommendation message may include media links to the recommended media tracks on the media server, and the sending may cause the media client to display the media links to a user. The recommendation message may also include the prioritization of the recommended media tracks, and thus the display of the media links may be based on the prioritization, such that media links to recommended media tracks that are more highly prioritized are displayed first, for example.

At 223, the method may include displaying the media links to the recommended media tracks on the graphical user interface of the media client on the user computing device. The media client may in turn receive a user selection of one or the displayed media links, which may generate a media track request for one of the recommended media tracks. Thus, at 224, the method may include receiving the media track request from the media client for one of the recommended media tracks, responsive to a traversal of one of the displayed media links by the user. At 226, the method may include sending the requested recommended media track to the media client. At 227, the method may include playing back the requested recommended media track via the media client on the user computing device.

It may be appreciated that the computing, selecting, and sending of the recommendation message, according to the above described method, can occur either according to a predetermined schedule, or when new media tracks are determined to be available from the media delivery engine, as discussed above.

Figure 3:
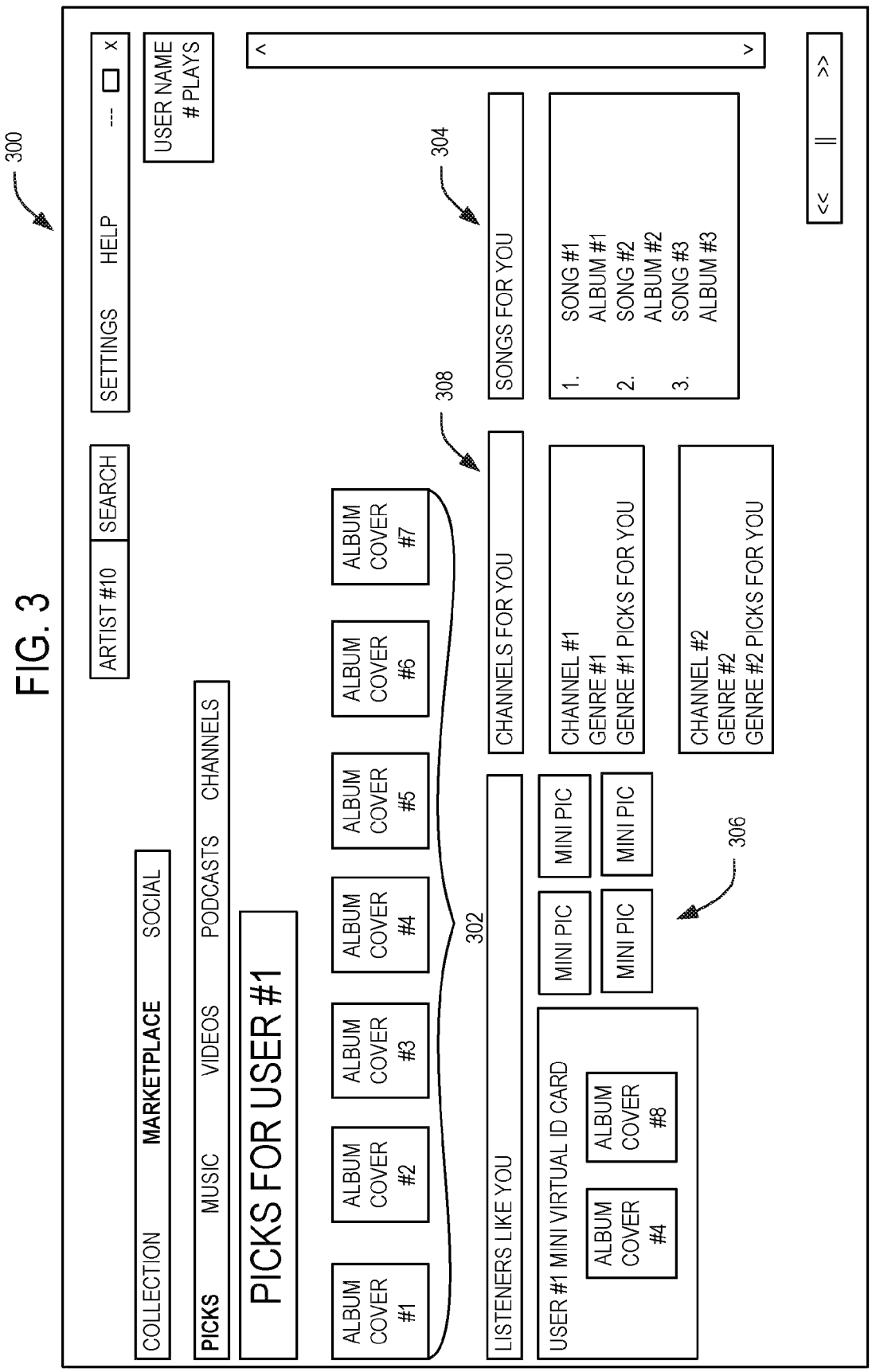
FIG. 3 is a schematic view of a graphical user interface by which media links for recommended media tracks may be displayed.

FIG. 3 is a schematic view of a graphical user interface (GUI) 300 by which media links may be displayed to a user via a media client. The graphical user interface 300 shows a number of "picks" for the user, where a "pick" will be understood to represent a recommended media track as described above. Graphical user interface 300 is configured to display media links embedded in images of album cover artwork 302. Clicking on an image of album cover artwork 302 will result in traversal of the media link and downloading of the recommended media track from the media server. In addition, the media links to the recommended media tracks may be located in a song list 304. Further still, graphical user interface 300 may show a virtual identification card for the user and virtual representations 306, for example in the form of miniature pictures, of other users of the music server with user-specific style weights statistically similar to the user, which may indicate similar tastes in music. It may be appreciated that the selection of the virtual representations 306 for display in the GUI 300 may be generated by a separate module independent of the recommendation engine 126 described herein.

Another way in which music may be recommended via graphical user interface 300 may be in the form of channels, as presented in a channel list 308. Accordingly, media links to recommended media tracks may be embedded in the channel list 308. Channels may include media tracks with common track-specific style weights, and thus the recommended channels may include media tracks with track-specific style weights that are statistically similar to the user's user-specific style weights. To summarize, in the depicted embodiment, any of the album cover artworks 302, songs in the song list 304, and channels in the channel list 308 may include media links to recommended media tracks.

Upon traversal (e.g., via a mouse click, touch activation, etc.) of a media link, the corresponding requested recommended media track may be delivered from the media delivery engine as described above. If a media link for a channel in the channel list 308 is traversed, a request for the recommended media tracks of that channel is sent to the media server, and the delivery engine described above may be configured to send the requested recommended media track to the media client. If the media link associated with the album cover artwork 302 is traversed, the media tracks associated with the album of the album cover artwork 302 may begin to be delivered from the media delivery engine to the media client. Similarly, traversing a media link in the song list 304 results in a request for the recommended media track associated with the media link in the song list to be sent to the server, and downloading of the associated recommended media track is commenced.

The above described systems and methods may be utilized to provide recommendations to a user of a media client for media tracks that the user might enjoy, based on past user history data about media track playback. Since each media track may be categorized by a plurality of defined media styles, the users' style preferences may be expressed with relatively fine granularity, utilizing user-specific style weights in each of several categories, based on the users' actual playback history. Such fine granularity of style preferences may be achieved without forcing the user to take elaborate steps to rank likes and dislikes of media tracks. Thus, in a relatively passive manner, the systems and methods described herein may be utilized to make useful recommendations to the user.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A system for making personalized media recommendations including a media server, the media server comprising:
   a media database containing a plurality of media tracks and a database schema defining multiple media styles, each of the media tracks being assigned one or more media styles, each media style of each media track being assigned a track-specific style weight, each track-specific style weight indicating a degree of applicability of that media style to its corresponding media track;
   a media delivery engine configured to transmit media tracks to each of a plurality of media clients via a computer network for playback via the media client;
   a feedback module configured to receive history data from each of the media clients, the history data including a track identifier and play count for each media track played by each user of each media client over a period of time;
   a recommendation engine configured to:
      compute a plurality of user-specific style weights, based on the track-specific style weights and play counts contained in the history data received for each user from each media client,
      select one or more recommended media tracks for each user, based on the user-specific style weights and the track-specific style weights for the recommended media tracks, and
      send a recommendation message to the media client including media links to the recommended media tracks on the media server, to cause the media client to display the media links to each user;
   a statistics engine configured to compute aggregate statistics based on the history data from the plurality of media clients;
   wherein the recommendation engine is further configured to select the one or more recommended media tracks for each user further based on the aggregate statistics; and
   wherein the recommendation engine is further configured to apply one or more of the following thresholds in selecting the one or more recommended media tracks:
      a threshold play count, according to which the recommendation engine only selects recommended media tracks based on media styles that have been played more than the threshold number play count by a user;
      a threshold percentage of total play time, according to which the recommendation engine only selects recommended media tracks based on media styles that account for the threshold percentage of the total play time of the user; and
      a threshold number of media styles, according to which the recommendation engine only selects recommended media tracks from the threshold number of media styles.

2. The media server of claim 1, wherein the media delivery engine is configured to receive a media track request from the media client for one of the recommended media tracks, responsive to a traversal of one of the displayed media links, and send a requested recommended media track associated with the media track request to the media client.

3. The media server of claim 1, wherein the recommendation engine is configured to compute, select and send the recommendation message to each media client either according to a predetermined schedule, or when new media tracks are determined to be available from the media delivery engine.

4. The media server of claim 1, wherein the recommendation engine is configured to select a plurality of recommended media tracks based on the history data for a user, by
   generating a set of candidate recommended media tracks;
   filtering out candidate recommended media tracks that the user has previously played, from the set, to thereby result in the plurality of recommended media tracks; and
   prioritizing the recommended media tracks according to those recommended media tracks that are most popular according to the aggregate statistics.

5. The media server of claim 4, wherein the recommendation engine is further configured to filter out candidate recommended media tracks that are not available for download from the media delivery engine.

6. The media server of claim 5, wherein the history data further includes user ratings for one or more of the recommended media tracks, wherein the recommendation engine is further configured to filter out candidate recommended media tracks that are associated with a user rating.

7. The media server of claim 5, wherein the recommendation engine is further configured to select one or more recommended media tracks from a plurality of new media track releases from an artist that the user has listened to a threshold number of artist playback times, according to the history data.

8. The media server of claim 5, wherein the recommendation engine is further configured to select a threshold recommendation number of recommended media tracks for each user of each media client.

9. A method for recommending personalized media comprising:
providing a media database containing a plurality of media tracks and a database schema defining multiple media styles, each of the media tracks being assigned one or more track-specific style weights, each track-specific style weight indicating a degree of applicability of a media style to a corresponding media track;
transmitting one or more media tracks from a media delivery engine to each of a plurality of media clients via a computer network for playback via the media clients;
receiving history data from each of the media clients, the history data including a track identifier and play count for each media track played by each user over a period of time;
computing a plurality of user-specific style weights, based on the track-specific style weights, and based on play counts contained in the history data received, for each user, from each media client;
selecting one or more recommended media tracks for each user, from the plurality of media tracks, based on the user-specific style weights and the track-specific style weights for the plurality of media tracks, wherein the selecting comprises applying a threshold number of media styles, and the recommended media tracks are selected only from the threshold number of media styles;
sending a recommendation message to the media client, for each user, including media links to the recommended media tracks on the media server, to cause the media client to display the media links to the users;
computing aggregate statistics based on the history data from the plurality of media clients, wherein the selection of one or more recommended media tracks for each user are further based on the aggregate statistics;
wherein computing, selecting, and sending the recommendation message to each media client, for each user, occurs either according to a predetermined schedule, or when new media tracks are determined to be available from the media delivery engine; and
wherein selecting further includes applying one or more of the following thresholds to select the one or more recommended media tracks, for a user:
a threshold play count, according to which the recommendation engine only selects recommended media tracks based on media styles that have been played by the user more than the threshold number play count; and
a threshold percentage of total play time, according to which the recommendation engine only selects recommended media tracks based on media styles that account for the threshold percentage of the total play time of the user.

10. The method of claim 9, further comprising:
receiving a media track request from the media client for one of the recommended media tracks, via traversal of one of the displayed media links; and
sending a requested recommended media track to the media client.

11. The method of claim 9, wherein selecting further includes:
generating a set of candidate recommended media tracks;
filtering out candidate recommended media tracks that the user has previously played to thereby result in the recommended media tracks; and
prioritizing the recommended media tracks according to those recommended media tracks that are most popular according to the aggregate statistics.

12. The method of claim 11, wherein selecting further includes filtering out candidate recommended media tracks that are not available for download from the media delivery engine.

13. The media server of claim 12, wherein the history data further includes user ratings for one or more of the candidate recommended media tracks, and wherein selecting further includes filtering out candidate recommended media tracks that are associated with the user ratings.

14. The media server of claim 13, wherein selecting further includes selecting as candidate recommended media tracks, new media track releases from an artist that the user has listened to a threshold number of artist playback times, according to the history data.

15. A system for making personalized media recommendations including a media server, the media server comprising:
a media database containing a plurality of media tracks and a database schema defining multiple media styles, each of the media tracks being assigned one or more track-specific style weights, each track-specific style weight indicating a degree of applicability of a media style to a corresponding media track;
a media delivery engine configured to transmit recommended media tracks to each of a plurality of media clients via a computer network for playback via the media client;
a feedback module configured to receive history data from each of the media clients, the history data including a track identifier and play count for each media track played by a user of each media client over a period of time;
a statistics engine configured to compute aggregate statistics based on the history data from the plurality of media clients; and
a recommendation engine configured to:
compute a plurality of user-specific style weights, based on the track-specific style weights and play counts contained in the history data received for each user from each media client,
select one or more recommended media tracks for each user, the recommended media tracks having track-specific style weights that correspond to one or more of the user-specific style weights, and further based on the aggregate statistics for the recommended media tracks, and
send a recommendation message to the media client, for each user, wherein the recommendation message includes media links to the recommended media tracks on the media server, and wherein the sending of the recommendation message causes the media client to display the media links to the user;
wherein the media delivery engine is configured to receive a request from the media client for one of the recommended media tracks, via traversal of one of the displayed media links, and send a requested recommended media track to the media client.

* * * * *